(12) United States Patent
Romppanen et al.

(10) Patent No.: US 7,643,816 B2
(45) Date of Patent: *Jan. 5, 2010

(54) MESSAGING SYSTEM FOR MANAGING COMMUNICATIONS RESOURCES

(75) Inventors: Timo Romppanen, Helsinki (FI); Ismo Antikainen, Masala (FI)

(73) Assignee: CVON Innovations Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/221,028

(22) Filed: Jul. 30, 2008

(65) Prior Publication Data

US 2008/0318555 A1    Dec. 25, 2008

Related U.S. Application Data

(63) Continuation of application No. 12/075,856, filed on Mar. 14, 2008.

(30) Foreign Application Priority Data

Jun. 25, 2007    (GB)    ................................ 0712291.4

(51) Int. Cl.
*H04M 11/00*    (2006.01)
(52) U.S. Cl. ........................ 455/405; 455/406; 455/407; 455/408; 455/409; 455/412.2; 455/413; 455/466; 379/114.16; 379/114.17; 379/114.21; 379/114.05; 379/114.23
(58) Field of Classification Search ......... 455/406–409, 455/412.12, 413, 466, 405; 379/114.16, 379/114.17, 114.21
See application file for complete search history.

(56) References Cited

U.S. PATENT DOCUMENTS 4,811,382 A * 3/1989 Sleevi ........................ 379/67.1

(Continued)

FOREIGN PATENT DOCUMENTS

DE    199 41 461 A1    3/2001

(Continued)

OTHER PUBLICATIONS

Notification of Transmittal of The International Search Report and the Written Opinion of the International Searching Authority (Form PCT/ISA/220) mailed Feb. 13, 2009 in related International Application No. PCT/EP2008/058117 (3 pages).

(Continued)

*Primary Examiner*—Lester Kincaid
*Assistant Examiner*—Charles Shedrick
(74) *Attorney, Agent, or Firm*—Frishauf, Holtz, Goodman & Chick, P.C.; Robert P. Michal

(57) ABSTRACT

Embodiments of the present invention relate to a messaging system for managing communications resources and are particularly suitable for providing a means for subscribers of a telecommunications network to continue participating in a communications service that would otherwise be ended due to the calling party having a low or zero balance. Embodiments of the invention are generally applicable to users of a mobile network.

Embodiments of the invention provide a messaging system for use by the telecommunications network to transmit a message to a remote party, where the remote party is identified by means of a telephone calling identifier associated with a call setup request for a telecommunications session received from a user of the telecommunications network. The messaging system comprises a storage system for storing data providing a predetermined definition of message content to be sent to the remote party. In response to trigger event such as determining that the account balance available for said user participating in the requested communications session is below a predetermined threshold, the messaging system is arranged to initiate the transmission of a message to said remote party. The transmitted message contains message content that is defined at least in part by said definition of message content and can comprise a "call me message." This thereby ensures that a "call me" message reaches the remote party.

77 Claims, 5 Drawing Sheets

U.S. PATENT DOCUMENTS

| | | | |
|---|---|---|---|
| 4,935,956 A * | 6/1990 | Hellwarth et al. | 379/144.02 |
| 5,408,519 A * | 4/1995 | Pierce et al. | 379/88.17 |
| 5,592,535 A | 1/1997 | Klotz | |
| 5,978,775 A | 11/1999 | Chen | |
| 5,978,833 A | 11/1999 | Pashley et al. | |
| 6,023,700 A | 2/2000 | Owens et al. | |
| 6,044,259 A * | 3/2000 | Hentila et al. | 455/406 |
| 6,097,942 A | 8/2000 | Laiho | |
| 6,639,977 B1 * | 10/2003 | Swope et al. | 379/114.21 |
| 7,072,947 B1 | 7/2006 | Knox et al. | |
| 7,164,927 B1 * | 1/2007 | Koch et al. | 455/466 |
| 7,529,357 B1 * | 5/2009 | Rae et al. | |
| 2002/0077130 A1 | 6/2002 | Owensby | |
| 2002/0137507 A1 | 9/2002 | Winkler | |
| 2002/0138291 A1 | 9/2002 | Vaidyanathan et al. | |
| 2002/0183040 A1 * | 12/2002 | Lundstrom et al. | 455/406 |
| 2002/0193093 A1 * | 12/2002 | Henrikson et al. | 455/407 |
| 2003/0040297 A1 | 2/2003 | Pecen et al. | |
| 2003/0040300 A1 | 2/2003 | Bodic et al. | |
| 2003/0076940 A1 * | 4/2003 | Manto | 379/114.05 |
| 2003/0197719 A1 | 10/2003 | Lincke et al. | |
| 2003/0216147 A1 * | 11/2003 | Morin et al. | 455/466 |
| 2004/0137874 A1 | 7/2004 | Veerepalli et al. | |
| 2004/0180648 A1 * | 9/2004 | Hymel et al. | 455/418 |
| 2004/0185827 A1 * | 9/2004 | Parks | 455/406 |
| 2004/0192359 A1 * | 9/2004 | McRaild et al. | 455/466 |
| 2004/0209649 A1 | 10/2004 | Lord | |
| 2004/0240649 A1 * | 12/2004 | Goel | 379/130 |
| 2004/0259526 A1 | 12/2004 | Goris et al. | |
| 2005/0113064 A1 * | 5/2005 | Halsell | 455/406 |
| 2005/0123111 A1 * | 6/2005 | Philbin et al. | 379/114.2 |
| 2005/0125397 A1 | 6/2005 | Gross et al. | |
| 2005/0238154 A1 * | 10/2005 | Heaton et al. | 379/127.01 |
| 2006/0025109 A1 * | 2/2006 | Levitan | 455/406 |
| 2006/0025129 A1 * | 2/2006 | Wolfman et al. | 455/432.1 |
| 2006/0031327 A1 | 2/2006 | Kredo | |
| 2006/0123014 A1 | 6/2006 | Ng | |
| 2006/0200460 A1 | 9/2006 | Meyerzon et al. | |
| 2006/0200461 A1 | 9/2006 | Lucas et al. | |
| 2006/0276170 A1 | 12/2006 | Radharishnan et al. | |
| 2006/0276213 A1 | 12/2006 | Gottschalk et al. | |
| 2006/0286962 A1 * | 12/2006 | Davis | 455/405 |
| 2006/0286963 A1 | 12/2006 | Koskinen et al. | |
| 2006/0288124 A1 | 12/2006 | Kraft et al. | |
| 2007/0074262 A1 | 3/2007 | Kikkoji et al. | |
| 2007/0077911 A1 * | 4/2007 | Raman | 455/405 |
| 2007/0091869 A1 * | 4/2007 | Kahn | 370/352 |
| 2007/0100805 A1 | 5/2007 | Ramer et al. | |
| 2007/0232300 A1 * | 10/2007 | Wolfman | 455/433 |
| 2008/0075249 A1 * | 3/2008 | Zach et al. | 379/114.17 |
| 2008/0125080 A1 * | 5/2008 | Phillips | 455/405 |
| 2009/0075627 A1 * | 3/2009 | Hwang et al. | 455/408 |

FOREIGN PATENT DOCUMENTS

| | | |
|---|---|---|
| EP | 1 109 371 A2 | 6/2001 |
| EP | 1 220 132 A2 | 7/2002 |
| EP | 1 249 995 A2 | 10/2002 |
| EP | 1 365 604 A2 | 11/2003 |
| EP | 1 455 511 A1 | 9/2004 |
| EP | 1 587 332 A1 | 10/2005 |
| EP | 1 615 455 A1 | 1/2006 |
| EP | 1 633 100 A1 | 3/2006 |
| GB | 2 406 996 A | 4/2005 |
| JP | 2002140272 | 5/2002 |
| WO | WO 96/24213 | 8/1996 |
| WO | WO 98/53637 | 11/1998 |
| WO | WO 00/44151 A2 | 7/2000 |
| WO | WO 01/22748 A1 | 3/2001 |
| WO | WO 01/31497 A1 | 5/2001 |
| WO | WO 01/57705 A1 | 8/2001 |
| WO | WO 01/58178 A2 | 8/2001 |
| WO | WO 01/63897 A1 | 8/2001 |
| WO | WO 01/65411 A1 | 9/2001 |
| WO | WO 01/69406 A1 | 9/2001 |
| WO | WO 01/71949 A1 | 9/2001 |
| WO | WO 01/72063 A1 | 9/2001 |
| WO | WO 01/91400 A2 | 11/2001 |
| WO | WO 01/93551 A2 | 12/2001 |
| WO | WO 01/97539 A3 | 12/2001 |
| WO | WO 02/31624 A2 | 4/2002 |
| WO | WO 02/054803 A1 | 7/2002 |
| WO | WO 02/069585 A2 | 9/2002 |
| WO | WO 02/075574 A1 | 9/2002 |
| WO | WO 02/084895 A1 | 10/2002 |
| WO | WO 03/015430 A1 | 2/2003 |
| WO | WO 03/019845 A2 | 3/2003 |
| WO | WO 03/024136 A1 | 3/2003 |
| WO | WO 03/088690 A1 | 10/2003 |
| WO | WO 2004/084532 A1 | 9/2004 |
| WO | WO 2004/086791 A1 | 10/2004 |
| WO | WO 2004/100521 A1 | 11/2004 |
| WO | WO 2004/107795 A1 | 12/2004 |
| WO | WO 2005/029769 A1 | 3/2005 |
| WO | WO 2005/076650 A1 | 8/2005 |
| WO | WO 2006/002869 A1 | 1/2006 |
| WO | WO 2006/027407 A1 | 3/2006 |
| WO | WO 2006/093284 | 9/2006 |
| WO | WO 2006/119481 A2 | 11/2006 |
| WO | WO 2008/013437 A1 | 1/2008 |

OTHER PUBLICATIONS

International Search Report (Form PCT/ISA/210) mailed Feb. 13, 2009 in related International Application No. PCT/EP2008/058117 (6 pages).

Written Opinion of the International Searching Authority (Form PCT/ISA/237) mailed Feb. 13, 2009 in related International Application No. PCT/EP2008/058117 (8 pages).

U.K. Search Report under Section 17 dated Aug. 16, 2007 of corresponding U.K. Application No. GB 0712291.4.

European Search Report dated Mar. 19, 2008 in corresponding European Patent Application No. EP 08 10 1640.

U.K. Search Report under Section 17 dated Jun. 9, 2008 in corresponding U.K. Application No. GB 0809536.6.

* cited by examiner

MESSAGING SYSTEM FOR MANAGING COMMUNICATIONS RESOURCES

CROSS-REFERENCE TO RELATED APPLICATION

This is a continuation of U.S. patent application Ser. No. 12/075,856 filed Mar. 14, 2008, which in turns claims priority of U.K. Patent Application No. GB 0712291.4 filed Jun. 25, 2007, the disclosure of each of which is incorporated herein by reference.

FIELD OF THE INVENTION

The present invention relates to a messaging system for managing communications resources and is particularly, but not exclusively, suitable for providing a means for subscribers of a communications network to continue participating in a communications service that would otherwise be ended due to the calling party having a low or zero balance. Embodiments of the invention are generally applicable to users of a mobile network.

BACKGROUND OF THE INVENTION

Broadly speaking there are two types of users of network resources in the mobile domain. The first type of user is a so-called "contract" subscriber, for whom usage of network resources is paid for after the resources have used; typically the payment period is monthly. Such post paid systems might include a credit limit service where a user or other party such as parent and/or operator sets a limit of money to be allocated to services. The allocation can be also periodic and can for example specify an amount of services per month.

The second type of user is a so-called "pay as you go" subscriber, for whom usage of network resources is paid for prior to the provisioning of a given service. These services might include also credit limit type of functionality so as to prevent usage of all the credits in less than a predetermined time period.

Usage of network resources by either type of user can be sponsored by third parties by means of information content such as advertisements and the like. In this scenario all or part of the usage is offset by the third party, either directly or indirectly and, depending on the type of user, either before or after a given service has been provided.

One problem commonly experienced by the pay as you go user and by a post paid user when a predetermined credit limit is reached is the refusal or termination of a service when the pre-paid quota (or credit limit or advertisement sponsoring of related services) is lower than a predetermined threshold. As is commonly known, in such situations the network alerts the user of the imminent ending of the communications session by means of a message such as beep sound or voice message. This message is typically delivered to the user about 3 minutes before the quota or credit has expired; once the credit has expired the user is typically unable to make phone calls or use messaging or other services.

Several workers have proposed a solution to this problem, generally referred to as the "call me" service, whereby the user with no or a low amount of credit sends a message to the remote party with whom they wish to communicate, asking the remote party to call them. Such messages can be transmitted using the Unstructured Supplementary Services Data (USSD) or via the Short Messaging Service (SMS), as described in US patent application having publication number US2004/0192359. However, a problem with these methods is that the user needs to have some credit for the "call me" message to be transmitted through the network.

SUMMARY OF THE INVENTION

In accordance with an aspect of the present invention, there is provided a messaging system and method as set out in the appended claims.

In comparison to conventional methods, with embodiments of the invention the network initiates transmission of a "call me" message in response to a trigger event such as the user's balance or available credit falling below a predetermined level. Since transmission of this message is under the control of the network, the network can ensure that there are sufficient resources to support transmission of the message, be this on the basis of communications resources allocated to a third party such as an advertiser, or on the basis of a reserve amount specified by the network operator.

The "call me" message is composed on the basis of predetermined definition of message content to be sent to a remote device. The message content can be specified by third parties, for example whom subsidise the transmission of such "call me" messages and/or any calls that are subsequently made by the remote device to the user. In addition or alternatively the message content can be specified by the user, for example via an interactive voice recognition (IVR) unit, which can be configured to check that the speech input received from the user does not exceed an available size of the predetermined message content.

Preferably the storage system is further arranged to store data providing a predetermined definition of message-associated information to be provided to the user, and the messaging system is arranged to transmit message-associated information to a device associated with the user. The message-associated information can include notification of the remote device to which the message is to be transmitted—in response to said trigger event—and can instruct the user to provide some sort of response. Once received, the messaging system can combine this response with the predetermined definition of message content so as to generate the "call me" message.

Further features and advantages of the invention will become apparent from the following description of preferred embodiments of the invention, given by way of example only, which is made with reference to the accompanying drawings.

DETAILED DESCRIPTION OF THE INVENTION

As described above, embodiments of the invention are generally concerned with providing a means for subscribers of a communications network to continue participating in a communications service that would otherwise be ended due to the calling party having a low or zero balance or amount of available credit. Typically embodiments of the invention would be applicable to subscribers of a mobile communications network 10 shown in FIG. 1. The mobile network 10 can be any cellular, broadcast, wide area network. Examples of cellular network technologies include but are not limited to GSM (Global System for Mobile communication), WCDMA (Wideband CDMA), CDMA (Code Division Multiple Access), GPRS (General Packet Radio Service), UTRAN (UMTS Radio Access Network), UMTS (Universal Mobile Telecommunications System), MBMS (Multicast Broadcast Multimedia System). Examples of other network technologies include but are not limited to local area networks, such as Wireless Local area networks (WLAN), BlueTooth (BT), and other technologies, such as WiMax (Worldwide Interoperability for Microwave Access), Broadcasting over cellular, Broadcasting over DVB-H (Digital Video Broadcasting-Handhelds), ISDB-T (Terrestrial Integrated Services Digital Broadcasting), DMB (Digital Multimedia Broadcasting). The communication network 10 may also be connected to a public switched telephone network (PSTN 9) and can provide generic Internet access using any transport methods. The communications network can be also a combination of different communication network technologies 9, 10, 11.

Figure 1:
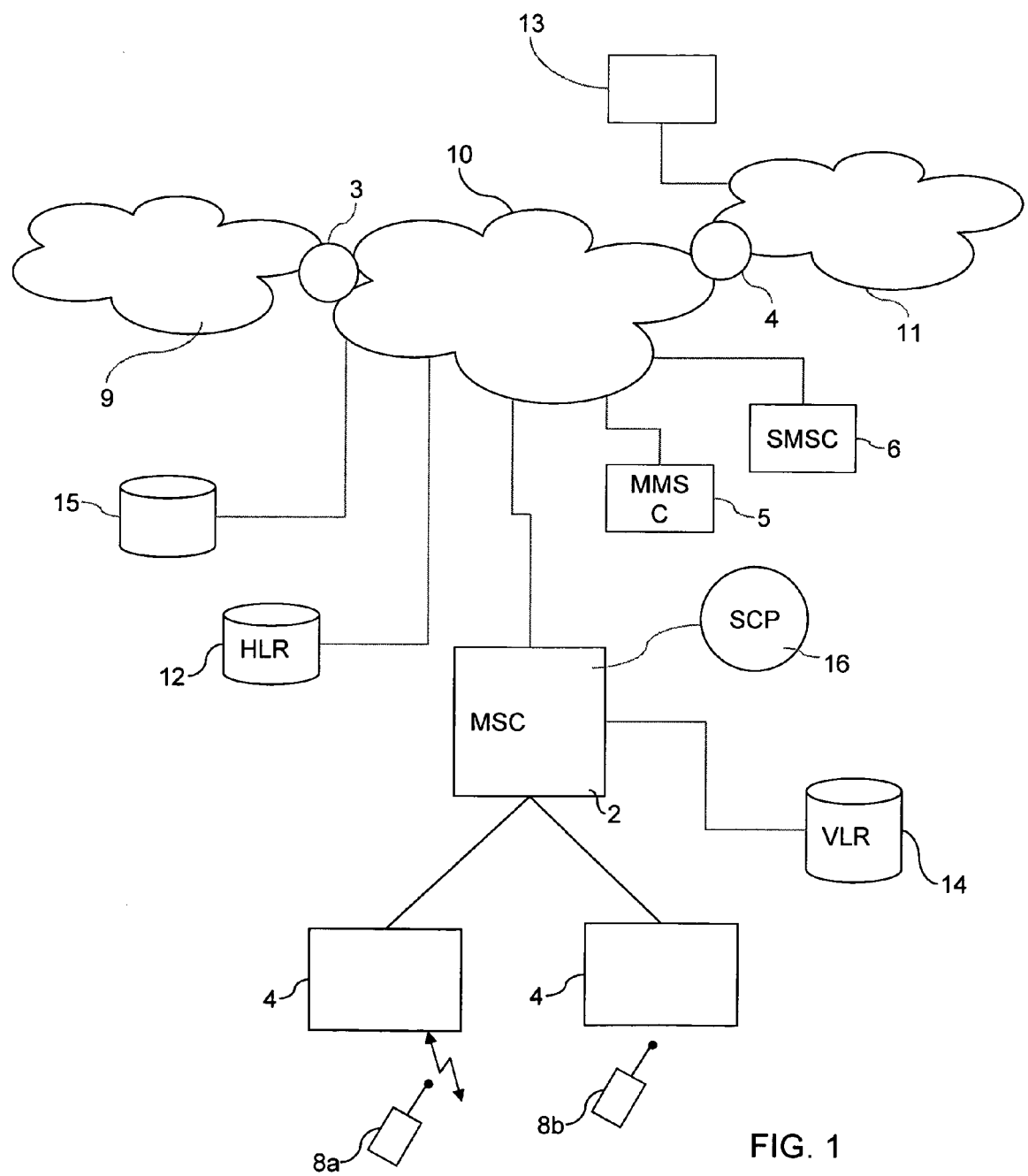
FIG. 1 is a block diagram showing an example of a communications environment within which embodiments of the invention can operate.

The exemplary GSM communications network 10 of FIG. 1 comprises a mobile switching centre (MSC) 2, which is connected via communications links to a number of base station controllers (BSCs) 4. Each BSC 4 controls one or more base transceiver stations (not shown) located remote from, and connected by further communications links to, the BSC. Each base transceiver transmits radio signals to, and receives radio signals from, mobile stations 8a, 8b which are in an area served by that transceiver. The mobile network 10 is provided with a home location register (HLR) 12 which is a database storing subscriber authentication data, and the MSC 2 is provided with a visitor location register (VLR) 14 which is a database temporarily storing subscriber authentication data for mobile stations active in its area. The MSC 2 is capable of handling service provision for both contract subscribers and prepaid subscribers of the network in the area it serves. Subscribers may originate or receive multimedia, video, voice, data or fax calls or sessions, short messages using the Short Message Service (SMS) via SMSC6, and email messages, enhanced or multimedia messages (MMS) via MMSC 5. Furthermore the user may access data and multimedia resources over private or public data networks such as the Internet 11. Signalling and data in respect of services provided to mobile stations 8a, 8b is routed via MSC 2. The communications network 10 also includes a billing system 15, which receives charging data from the MSC 2 and generates Call Detail Records (CDR) for post paid customers, and is accessible by Intelligent Network platforms supporting prepaid customers in order to identify discounts applicable to network services provisioned to prepaid customers.

The mobile terminals 8a, 8b may be a mobile phone, a personal digital assistant (PDA), a multimedia computer, a personal computer, a lap top, etc., or generally any terminal capable of accessing services, such as content download, web browsing, streaming, Wireless Application Protocol (WAP) browsing, voice and messaging. In the case of the mobile network 10 being embodied as a GSM or WCDMA network, the terminal is a mobile phone with GSM or WCDMA functionalities. FIG. 1 shows two terminals: 8a, referred to herein as the terminal associated with subscriber A; and 8b, referred to as the terminal associated with subscriber B.

Figure 2:
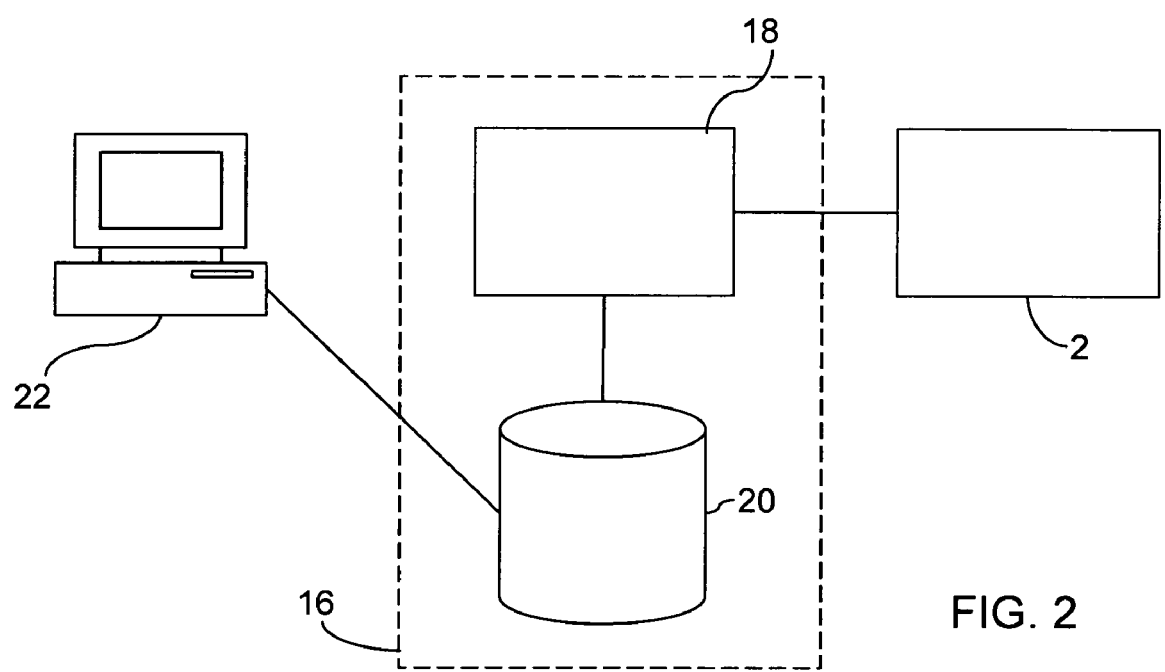
FIG. 2 is a block diagram showing components of a Service Control Platform shown in FIG. 1.

In respect of service provision to prepaid subscribers using a GSM mobile station 8a the MSC 2 functions as a Service Switching Point (SSP) and is connected to and controlled by Service Control Point (SCP) 16 with which it can communicate using the Intelligent Network Application Protocol (INAP). The specification of INAP is provided in European Telecommunications Standards Institute (ETSI) standard ETS 300 374-1 and specifies sets of standard instructions that can pass between components of a given mobile network so as to provision and control calls and data messages. As can be seen from FIG. 2, SCP 16 comprises a Prepaid Control Function (PCF) 18 connected to a Service Data Function (SDF) 20. PCF 18 is connected to MSC 2 with which it communicates using INAP messages as described above and is responsible for performing the data processing steps required to control the operation of MSC 2. The SDF 20 is responsible for storing data relating to prepaid subscribers, such as prepaid account balance data for a subscriber, instance data relating to services currently being provided to a prepaid subscriber, and, according to the present invention, messaging information and instructions on behalf of a subscriber (to be described in detail below). The SDF 20 is connected to user terminal 22 for user entry and amendment of data stored in respect of a prepaid subscriber.

Figure 3:
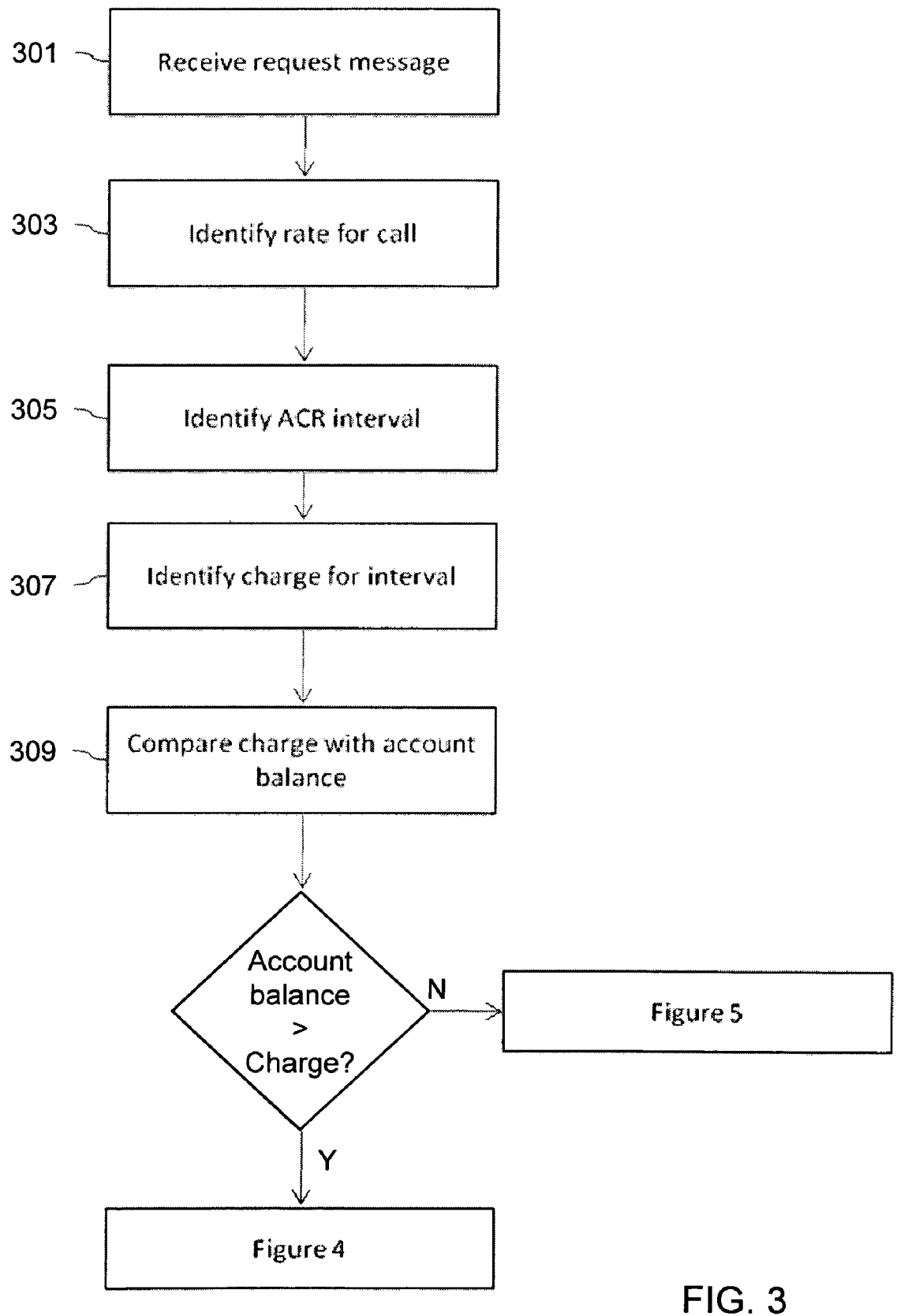
FIG. 3 is a flow diagram showing steps associated with call set up according to an embodiment of the invention.

FIG. 3 is a flow diagram showing, in detail, the data processing steps performed by SCP 16 when determining how to handle a call request (e.g. by invoking the Get Call Action INAP method), and to determine actions to be taken in the event that the subscriber has an insufficient amount of credit in his account. When providing a user with access to communications services, MSC 2 typically passes an INAP request message to PCF 18 requesting instruction in respect of a new or ongoing provision of a service to a prepaid subscriber (step 301). The request message normally provides information concerning the service and the identity of the subscriber. The PCF 18 determines how to handle the request on the basis of the service information provided by MSC 2, on the basis of generally applicable information concerning service provision and characteristics or information concerning the prepaid subscriber, which are obtained by invoking a method of SDF 20.

In order to identify a charge for the call, and thus evaluate whether or not the subscriber has sufficient credit for the call, a rate for the call is determined by consulting a generally applicable rating table maintained in SDF 20 using the chargeable destination and call type provided by MSC 2 (step 303). Typically prepaid network services are provisioned in blocks of time periods, and at the end of any given time period the account balance is evaluated in order to establish whether or not the call can continue. This evaluation is provided by the PCF 18 performing an INAP Apply-Charging-Report (ACR) method, and the duration for any block of time is calculated during provision of a metered service so as to determine the frequency at which charging for the service is to be performed. The process is generally dependent on the applicable rate for provision of the service, and upon the current account balance of the prepaid subscriber. Thus, the ACR method may be performed relatively infrequently when there are ample prepaid funds in the subscriber's account balance and relatively frequently when the subscriber's prepaid balance approaches zero or some other specified level.

Accordingly, at step 305 the PCF 18 identifies an interval of time before the first Apply-Charging-Report (ACR) method is to be performed. The process then continues to step 307 at which the method identifies a charge for the time period between the start of the call and the first invocation of the ACR method. The SCP 16 compares this charge with the account balance (step 309); in the event that the account balance is less than is required to cover the charge for this period, the SCP 16 performs the messaging action according to embodiments of the invention (FIG. 5, described in detail below) and generates an INAP Release Call response message for sending to MSC 2 in order to terminate the call. Assuming the account balance to be sufficient to support the charge, the SCP 16 passes an INAP ACR response message to MSC 2, instructing it to connect the call as a chargeable call and to generate an INAP ACR request message after the calculated period has expired (unless the call is terminated early, for example by the subscriber ending the call, in which case an ACR request message may be generated earlier and will include the unexpired charging period remaining).

Figure 4:
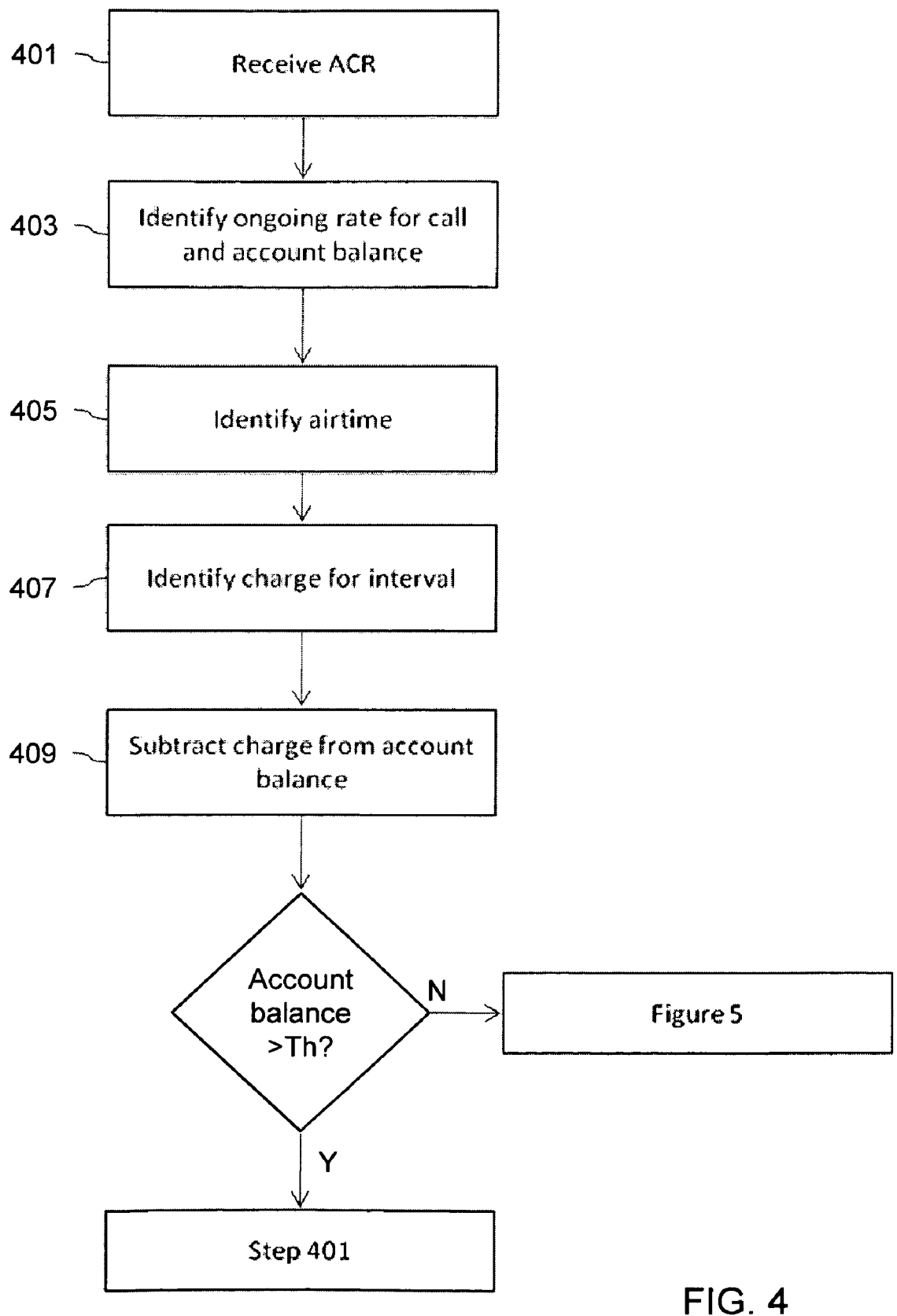
FIG. 4 is a flow diagram showing steps associated with ongoing management of a communications session according to an embodiment of the invention.

The steps associated with servicing an ACR request message after the calculated period has expired are shown in FIG. 4, which is a flow diagram showing the data processing steps performed by SCP 16 when performing ACR processing for ongoing chargeable calls. MSC 2 passes to PCF 18 an INAP ACR request message after the calculated charging period has expired or earlier (step 401). This results in SCP 16 applying rated charges for the call, and determining whether or not the prepaid subscriber has sufficient prepaid balance to continue the call. At step 403, the prepaid subscriber's account balance and the rating information for the call are identified from the instance data for the ongoing call. The airtime used since the ACR processing was performed is then calculated (or since the start of the call if this is the first such processing: step 405) and the call charges are calculated on the basis of the used airtime, the start of call time and rate class; this is then subtracted from the account balance, and the SCP 16 determines whether the prepaid subscriber's currently available account balance is greater than a predetermined threshold, Th (step 409). If not, i.e. if the subscriber's currently available balance is less than or equal to zero, the process invokes a messaging action according to embodiments of the invention (FIG. 5) and the Call Action parameter is set to 'release call'. This causes SCP 16 to generate a Release Call instruction for sending to MSC 2, resulting in the call being terminated due to lack of available prepaid funds. If the account balance is greater than zero, the PCF 14 cycles back to step 401, waiting for receipt of a next ACR message from the MSC 2. Typically the threshold is an amount that will cover the transmission of the various messages.

As will be appreciated from the foregoing, the messaging action process is triggered whenever the SCP 16 determines that the user's prepaid balance cannot support provision or continuation of a call/service. The messaging action is defined, per subscriber, in the SDF 20, which can store records identifying message content, type, format, in addition to actions; assuming the subscriber initiating the call to be associated with terminal A and the called party to be terminal B, these can include any of the following:

| Message Content M1 for terminal A | Message Content M2 for terminal B | Message Actions |
| --- | --- | --- |
| "You do not have any credit left, please wait for a while and we will ask the party you are calling to call you" | "Call me on [MSISDN A]!" | Send SMS to disconnected subscriber A and to called party B |
| "You do not have any credit left, please press 1 if you wish to inform the party you are calling to call you" | "Call me on [MSISDN A]! This message has been automatically generated on behalf of subscriber A" | Send SMS to disconnected subscriber A and to called party B upon receipt of key input 1 from subscriber A |
| "You do not have any credit left, please wait for a while and will ask the party you are calling to call you" | "Call me on [MSISDN A]! This message has been automatically generated on behalf of subscriber A by SuperFoods ™ Ltd." | Send SMS to disconnected subscriber A and to called party B |
| "You do not have any credit left, please wait for a while and we will ask the party you are calling to call you; the call will be subsidized by SuperFoods ™" | "Call me on [MSISDN A]! This call will be subsidized by SuperFoods ™ Ltd." | Send SMS to disconnected subscriber A and SMS to called party B |
| "You do not have any credit left, please reply to this message with a message for transmission to [MSISDN B]" | Message composed by subscriber A | Send SMS to disconnected subscriber A and to called party B |

The message could alternatively be transmitted as an Instant message, as an MMS or as an e-mail message, and the message type could be specified in the records stored by the SDF 20 per party called by terminal A (so that for example an SMS is sent to called party B, an e-mail is sent to called party C etc.).

The SDF 20 can also include records indicating third parties that are willing to subsidise the call back from terminal B to terminal A and/or the transmission of the messages intended to invoke call back between terminal B and terminal A; the table above gives "SuperFoods™" as an example. Referring back to FIG. 1, the public network 11 has a service server 13 connected thereto, and this can be accessed by third parties wishing to subsidise such a call back service. The service server 13 would be in association with SCP 16 and the subscriber A would have to have signed up to the service associated with server 13 so that the records in the SDF 20 can identify the subsidizing party and thus enable messages to be populated as indicated above. In one arrangement the service server 13 can specify an amount of network resources it is willing to subsidise and optionally a time period during which calls back are to be subsidised, and this can be used by the billing system 13 to offset call back calls made by terminal B (and indeed any other called party that calls terminal A back in response to receipt of a call back message).

In addition the content of the message sent to the called party can be specified by the user of terminal A via a Web or WAP interface, either via terminal A or via another device, when the user signs up to the service via the service server 13 (or indeed at any time after signing up). Alternatively the service server 13 could be arranged to accept speech input, for example in the event that the service server 13 cooperates with an Interactive Voice Recognition (IVR) system (not shown) connected to the mobile network 10. In the latter arrangement the IVR system would analyse the message dictated by the user of terminal A as the message is being composed to ensure that the content can be accommodated within the message constraints of the Short Messaging Service; in the event that the message exceeds the available number of characters, the IVR can interrupt the user and invite him to recompose or modify the message.

Figure 5:
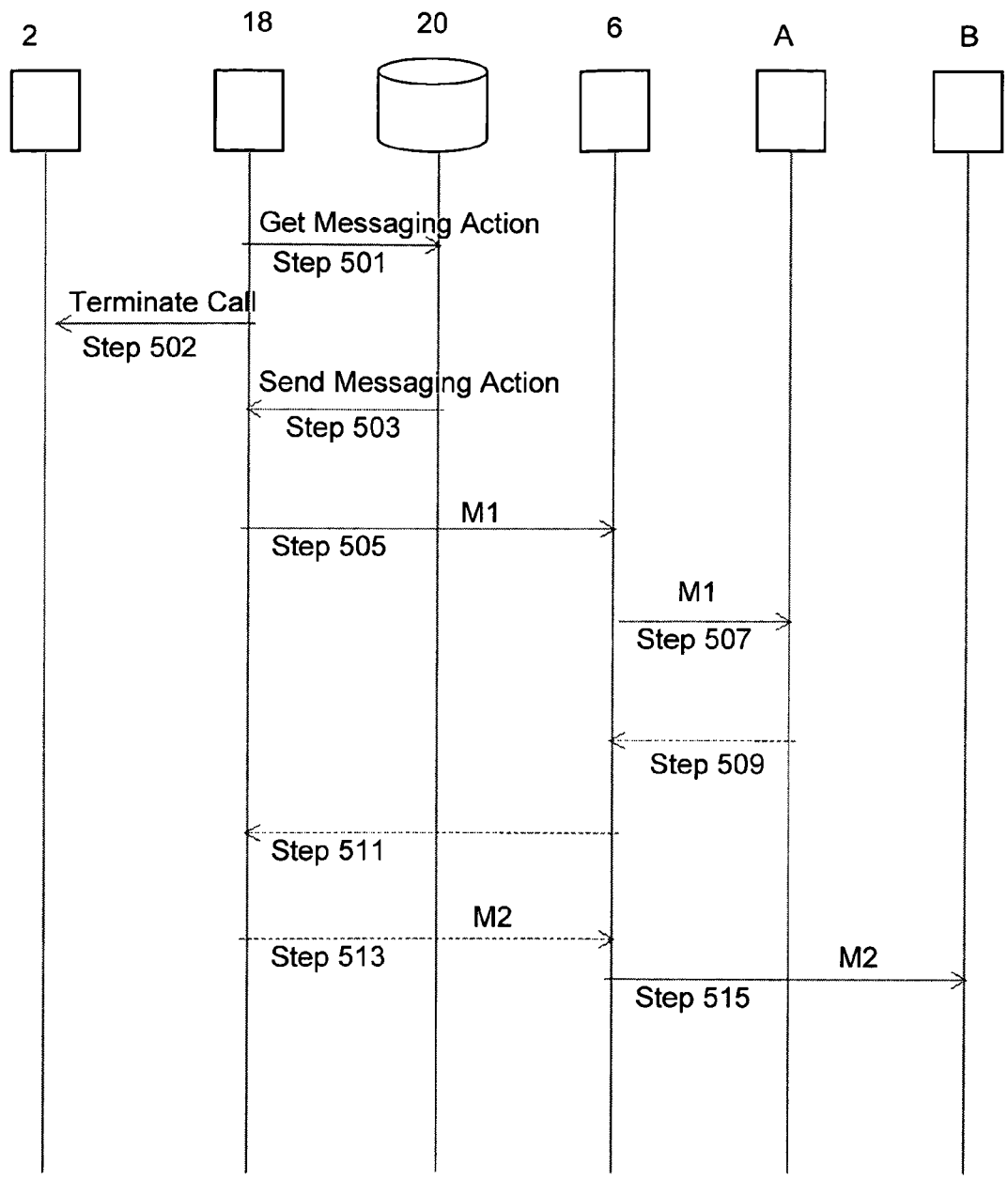
FIG. 5 is a timing diagram showing steps associated with providing messaging actions according to an embodiment of the invention.

Turning to FIG. 5, responsive to the PCF 14 identifying that the account balance is zero (or insufficient to support commencement of a call), the PCF 14 sends a request to the SDF 20 in order to determine and then trigger the messaging action (step 501). The request includes an identifier associated with the called party, for example the MSISDN of terminal B, causing the SDF 20 to look up records corresponding to the calling (and now terminated) party A; in the event that there is a prestored SMS message and transmission instruction stored for party A in relation to the called party (terminal B), the SDF 20 passes the messages M1, M2 to the PCF 14 (step 503) for transmission via the SMSC 6 and thence to terminals A and B respectively (steps 505, 513, 515). In addition to requesting a messaging action from the SDF 20, the PCF 14 sends an INAP message to the MSC 2 to trigger termination of the call placed by terminal A (step 502). FIG. 5 relates to the case in which the sending of message M2 is dependent on a response from terminal A in respect of message M1, and shows that the PCF 14 delays transmission of message M2 until the response has been received (steps 509, 511). However, it will be appreciated that message M2 can be transmitted by the PCF 14 together with message M1.

Additional Details and Modifications

The above embodiments are to be understood as illustrative examples of the invention. Further embodiments of the invention are envisaged. For example, the method could be used in relation to Voice over IP calls.

Whilst the above embodiment is illustrative of call handling in relation to GSM Intelligent Network procedures and platforms, the skilled person will appreciate that the messaging actions could be coordinated in other ways, such as for example involving devices in the public network portion 11.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A messaging system for use in a telecommunications network, said messaging system being for use by the telecommunications network to transmit a message to a remote device of a second user, the remote device of the second user being identified by means of a telephone calling identifier associated with a call setup request for a call session received from a device of a first user of the telecommunications network, said messaging system comprising: a storage system for storing data providing a predetermined definition of message content to be sent to a remote device of the second user; transmission means for, in response to a trigger event, invoking transmission of a message to said remote device of the second user, said transmission of the message to the remote device of the second user being further dependent on data received from the device of the first user after the call setup request, wherein trigger means for identifying that said trigger event occurs when it is determined that an account balance available for said device of the first user participating in the requested communications call session is below a predetermined threshold, and wherein said transmitted message includes message content defined at least in part by said definition of message content and said data received from the device of the first user after the call setup request.

2. The messaging system according to claim 1, wherein the storage system is further arranged to store data providing a predetermined definition of message-associated information to be provided to said device of the first user, and the messaging system is arranged to transmit, according to the predetermined definition, message-associated information to a device associated with the device of the first user, said message-associated information including notification of the remote device of the second user to whom the message is transmitted in response to said trigger event.

3. The messaging system according to claim 2, wherein the transmission means is arranged to send the message-associated information to the device of the first user in response to the trigger event, and, responsive to a response message containing said data, to include the data in the message transmitted to the remote device of the second user.

4. The messaging system according to claim 3, wherein the predetermined definition of message content to be sent to the remote device of the second user includes content specified by an information provider.

5. The messaging system according to claim 2, wherein the predetermined definition of message content to be sent to the remote device of the second user includes content specified by an information provider.

6. The messaging system according to claim 1, wherein the predetermined definition of message content to be sent to the remote device of the second user includes content specified by an information provider.

7. The messaging system according to claim 6, wherein use of network resources in respect of a subsequently received request for call set up from the remote device of the second user to the device of the first user are offset by resources allocated to the information provider.

8. The messaging system according to claim 7, wherein use of network resources for transmission of said message to said remote device of the second user and/or said message-associated information to the device of the first user are offset by resources allocated to the information provider.

9. The messaging system according to claim 6, wherein use of network resources for transmission of said message to said remote device of the second user and/or said message-associated information to the device of the first user are offset by resources allocated to the information provider.

10. The messaging system according to claim 1, the telecommunications network including an interactive voice recognition device arranged to receive speech input from the device of the first user, whereby to provide said data to be sent to the remote device of the second user.

11. The messaging system according to claim 7, wherein the interactive voice recognition device is arranged to analyze said speech input against a predetermined size of message content and to notify the device of the first user in the event that the received speech input exceeds the predetermined size of message content.

12. The messaging system according to claim 11, wherein the interactive voice recognition device is responsive to a modification instruction received from the device of the first user so as to modify the received speech input with speech input subsequently specified by the user.

13. The messaging system according to claim 11, wherein the interactive voice recognition device is responsive to a cancellation instruction received from the device of the first user so as to replace the received speech input with speech input subsequently specified by the user.

14. The messaging system according to claim 1, wherein said predetermined definition of message content is stored in association with user records corresponding to said device of the first user and with said telephone calling identifier corresponding to a given remote device of the second user.

15. The messaging system according to claim 1, further comprising means arranged to invoke termination of the call session in response to the trigger event.

16. The messaging system according to claim 15, wherein the user records include data indicative of a rate to be applied in respect of a given requested communications session, and the means for invoking termination of the call session is arranged to perform an evaluation process comprising evaluating the account balance for said device of the first user in relation to a predetermined amount of call time and a said rate.

17. The messaging system according to claim 16, wherein the means for invoking termination of the call session is arranged to perform said evaluation process during set up of said communications session requested by the device of the first user.

18. The messaging system according to claim 1, including a storage system arranged to store user records including data indicative of said account balance associated with said device of the first user.

19. The messaging system according to claim 18, wherein the user records are stored independently of said data providing a predetermined definition of message content to be sent to a remote device of the second user.

20. A method of controlling transmission of messages in respect of a call session involving a device of the first user of a communications network and a remote device of a second user, the remote device of the second user being identified by means of a telephone calling identifier associated with a call setup request for the call session received from the device of the first user of telecommunications network, the telecommunications network comprising a storage system for storing data providing a predetermined definition of message content to be sent to the remote device of the second user, said method comprising: monitoring, during the call session, an account balance available for said device of the first user participating in the requested call session against a predetermined threshold; and when the available account balance is determined to be below the predetermined threshold, initiating transmission of a message to said remote device of the second user, wherein said transmission of the message to the remote device is dependent on data received from the device of the first user after the call setup request, said transmitted message containing message content defined at least in part by said definition of message content and comprising said data received from the device of the first user after the call setup request.

21. The method according to claim 17, further comprising transmitting message-associated information to the device of the first user, said message-associated information including notification of the remote device of the second user to whom the message is transmitted in response to said available account balance being determined to be below the predetermined threshold.

22. The method according to claim 21, further comprising:
identifying a message body from said data received from the device of the first user; and
on the basis of said definition of message content, creating a message comprising said message body, whereby to create said message for transmission to the remote of device of the second user.

23. The method according to claim 20, further comprising:
identifying a message body from said data received from the device of the first user; and
on the basis of said definition of message content, creating a message comprising said message body, whereby to create said message for transmission to the remote device of the second user.

24. The method according to claim 23, in which the communications network stores user records comprising data identifying an information provider, the method further comprising offsetting use of network resources in respect of a subsequently received request for call set up from the remote device of the second user to the device of the first user by resources allocated to the information provider.

25. The method according to claim 22, in which the communications network stores user records comprising data identifying an information provider, the method further comprising offsetting use of network resources in respect of a subsequently received request for call set up from the remote device of the second user to the device of the first user by resources allocated to the information provider.

26. The method according to claim 23, further comprising offsetting transmission of said message to said remote device of the second user and/or said message-associated information to the device of the first user by resources allocated to the information provider.

27. The method according to claim 26, in which the process is performed in relation to a predetermined amount of call time and a rate for the call session.

28. The method according to claim 25, in which the process is performed in relation to a predetermined amount of call time and a rate for the call session.

29. The method according to claim 24, in which the process is performed in relation to a predetermined amount of call time and a rate for the call session.

30. The method according to claim 23, in which the process is performed in relation to a predetermined amount of call time and a rate for the call session.

31. The method according to claim 22, in which the process is performed in relation to a predetermined amount of call time and a rate for the call session.

32. The method according to claim 21, in which the process is performed in relation to a predetermined amount of call time and a rate for the call session.

33. The method according to claim 20, in which the process is performed in relation to a predetermined amount of call time and a rate for the call session.

34. The method according to claim 33, further comprising terminating the call session.

35. The method according to claim 26, further comprising terminating call session.

36. The method according to claim 25, further comprising terminating the call session.

37. The method according to claim 24, further comprising terminating the call session.

38. The method according to claim 23, further comprising terminating call session.

39. The method according to claim 22, further comprising terminating call session.

40. The method according to claim 21, further comprising terminating the call session.

41. The method according to claim 20, further comprising terminating the call session.

42. The method according to claim 41, further comprising performing said monitoring of said account balance during set-up of said call session requested by the device of the first user.

43. The method according to claim 33, further comprising performing said monitoring of said account balance during set-up of said call session requested by the device of the first user.

44. The method according to claim 26, further comprising performing said monitoring of said account balance during set-up of said call session requested by the device of the first user.

45. The method according to claim 25, further comprising performing said monitoring of said account balance during set-up of said call session requested by the device of the first user.

46. The method according to claim 24, further comprising performing said monitoring of said account balance during set-up of said call session requested by the device of the first user.

47. The method according to claim 23, further comprising performing said monitoring of said account balance during set-up of said call session requested by the device of the first user.

48. The method according to claim 22, further comprising performing said monitoring of said account balance during set-up of said call session, requested by the device of the first user.

49. The method according to claim 21, further comprising performing said monitoring of said account balance during set-up of said call session, requested by the device of the first user.

50. The method according to claim 20, further comprising performing said monitoring of said account balance during set-up of said call session requested by the device of the first user.

51. The method according to claim 41, further comprising performing the monitoring of said account balance during said call session.

52. The method according to claim 33, further comprising performing the monitoring of said account balance during said call session.

53. The method according to claim 26, further comprising performing the monitoring of said account balance during said call session.

54. The method according to claim 25, further comprising performing the monitoring of said account balance during said call session.

55. The method according to claim 24, further comprising performing the monitoring of said account balance during said call session.

56. The method according to claim 23, further comprising performing the monitoring of said account balance during said call session.

57. The method according to claim 22, further comprising performing the monitoring of said account balance during said call session.

58. The method according to claim 21, further comprising performing the monitoring of said account balance during said call session.

59. The method according to claim 20, further comprising performing the monitoring of said account balance during said call session.

60. A computer program product, or a suite of computer program products for controlling transmission of messages in respect of a call session involving a device of the first user of a telecommunications network and a remote device of a second user, the remote device of the second user being identified by means of a telephone calling identifier associated with a call setup request for the call session received from the device of the first user of the telecommunications network, the telecommunications network comprising a storage system for storing data providing a predetermined definition of message content to be sent to a remote device of the second user, comprising program code means being adapted to perform the steps of monitoring, during the call session, an account balance available for said device of the first user participating in the requested call session against a predetermined threshold; and when the available account balance is determined to be below the predetermined threshold, initiating transmission of a message to said remote device of the second user, wherein said transmission of the message to the remote device of the second user is dependent on data received from the device of the first user after the call setup request, said transmitted message containing message content defined at least in part by said definition of message content and comprising said data received from the device of the first user after the call setup request.

61. The computer program product according to claim 60, the program code means being further adapted to perform the step of:

transmitting message-associated information to the device of the first user, said message-associated information including notification of the remote device of the second user to whom the message is transmitted in response to said available account balance being determined to be below the predetermined threshold.

62. The computer program product according to claim 60, the program code means being further adapted to perform the step of:

identifying a message body from said data received from the device of the first user; and on the basis of said definition of message content, creating a message comprising said message body, whereby to create said message for transmission to the remote device of the second user.

63. The computer program product according to claim 60, in which the telecommunications network stores user records comprising data identifying an information provider, the program code means being further adapted to perform the step of offsetting use of network resources in respect of a subsequently received request for call set up from the remote device of the second user to the device of the first user by resources allocated to the information provider.

64. The computer program product according to claim 60, the program code means being further adapted to perform the step of offsetting transmission of said message to said remote device of the second user and/or said message-associated information to the device of the first user by resources allocated to the information provider.

65. The computer program product according to claim 60, the program code means being further adapted to perform the step of performing the process in relation to a predetermined amount of call time and a rate for the call session.

66. The computer program product according to claim 60, the program code means being further adapted to perform the step of terminating the call session.

67. The computer program product according to claim 60, the program code means being further adapted to perform the step of performing said monitoring of said account balance during set-up of said call session, requested by the device of the first user.

68. The computer program product according to claim 60, the program code means being further adapted to perform the step of performing the monitoring of said account balance during said call session.

69. A computer-readable medium having stored thereon a data structure comprising a computer program product, or a suite of computer program products for controlling transmission of messages in respect of call session involving a device of the first user of a telecommunications network and a remote device of a second user, the remote device of the second user being identified by means of a telephone calling identifier associated with a call setup request for the call session received from the device of the first user of the telecommunications network, the telecommunications network comprising a storage system for storing data providing a predetermined definition of message content to be sent to a remote device of the second user, the computer program product stored on the computer-readable medium comprising program code means being adapted to perform the steps of: monitoring, during the call session, an account balance available for said device of the first user participating in the requested communications session against a predetermined threshold; when the available account balance is determined to be below the predetermined threshold, initiating transmission of a message to said remote device of the second user, wherein said transmission of the message to the remote device of the second user is dependent on data received from the device of the first user after the call setup request, said transmitted message containing message content defined at least in part by said definition of message content and comprising said data received from the device of the first user after the call setup request.

70. The computer-readable medium according to claim 69, the computer-readable medium being further adapted to perform the step of:

transmitting message-associated information to the device of the first user, said message-associated information including notification of the remote device of the second user to whom the message is transmitted in response to said available account balance being determined to be below the predetermined threshold.

71. The computer-readable medium according to claim 69, the computer-readable medium being further adapted to perform the steps of:

identifying a message body from said data received from the device of the first user; and on the basis of said definition of message content, creating a message comprising said message body, whereby to create said message for transmission to the remote device of the second user.

72. The computer-readable medium according to claim 70, in which the communications network stores user records comprising data identifying an information provider, the computer-readable medium being further adapted to perform the step of offsetting use of network resources in respect of a subsequently received request for call set up from the remote device of the second user to the device of the first user by resources allocated to the information provider.

73. The computer-readable medium according to claim 69, in which the communications network stores user records comprising data identifying an information provider, the computer-readable medium being further adapted to perform the step of offsetting use of network resources in respect of a subsequently received request for call set up from the remote device of the second user to the device of the first user by resources allocated to the information provider.

74. The computer-readable medium according to claim 69, the computer-readable medium being further adapted to perform the step of performing the process in relation to a predetermined amount of call time and a rate for the call session.

75. The computer-readable medium according to claim 69, the computer-readable medium being further adapted to perform the step of terminating the call session.

76. The computer readable medium according to claim 69, the computer-readable medium being further adapted to perform said monitoring of said account balance during set-up of said call session requested by the device of the first user.

77. The computer-readable medium according to claim 69, the computer-readable medium being further adapted to perform the step of performing the monitoring of said account balance during said call session.

* * * * *